United States Patent Office 2,851,310
Patented Sept. 9, 1958

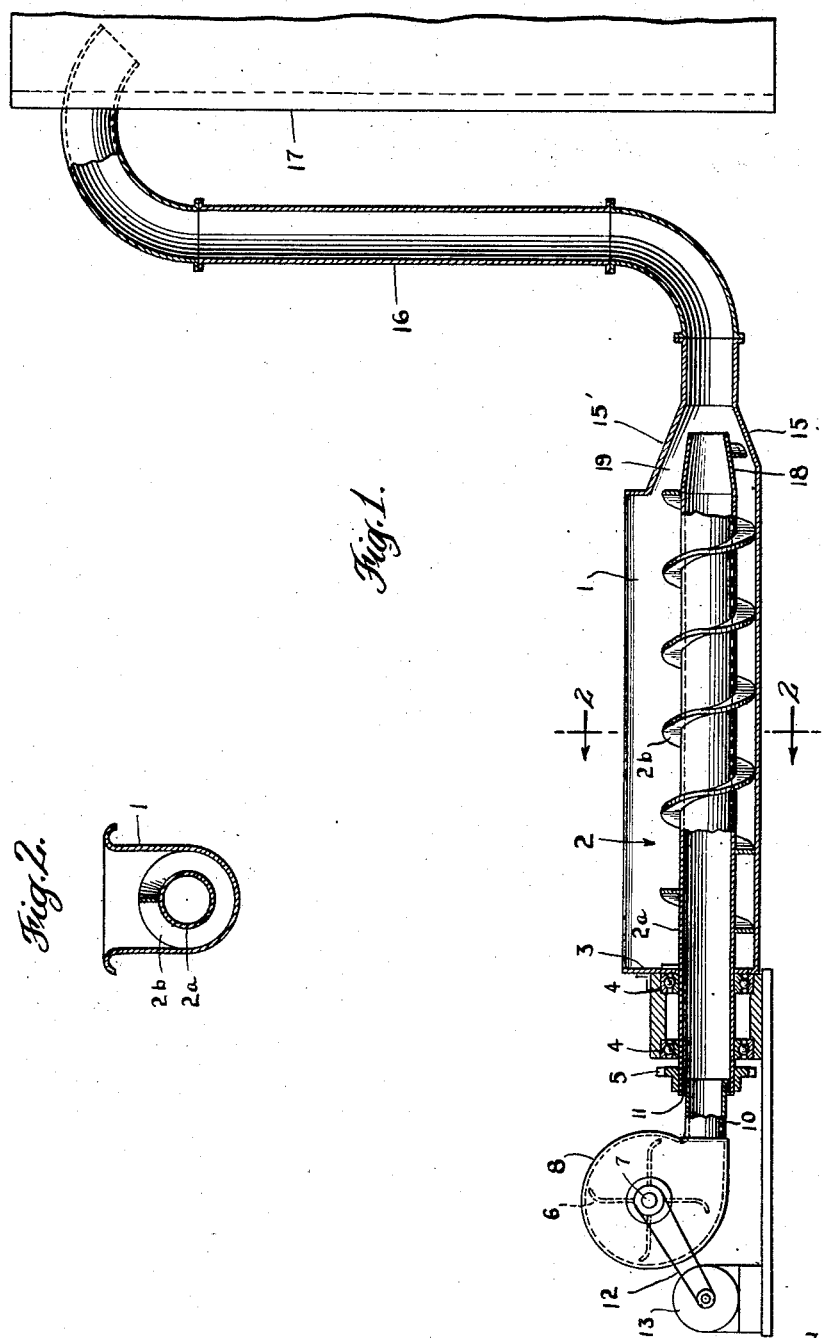

2,851,310

BLOWER CONVEYER

Albert M. Best, New Holland, Pa., assignor, by mesne assignments, to Sperry Rand Corporation, New Holland, Pa., a corporation of Delaware Application December 1, 1953, Serial No. 395,436

1 Claim. (Cl. 302—50)

This invention relates to a blower conveyor of the type in which the conveyed material is injected into a conveying fluid, such as air moving through a suitable pipe or conduit. Such a conveyor has been found admirably adapted for use in conveying flocculent fibrous materials such as semi-dried chopped hay or the like, as well as powdered and granular materials.

It has heretofore been known to inject a conveying fluid into a conveyor pipe or conduit through the shaft of an auger extending into and rotating in the pipe, the auger itself feeding the conveyed material into the pipe. Under such circumstances, however, it has been necessary that the auger shaft be of relatively small diameter relative to the conveyor pipe in order to leave room for the auger flights within the pipe. Accordingly, the conveying fluid, even though issuing at extremely high speeds from the hollow auger shaft, has been insufficient in volume to effect an efficient conveying of the materials through the conveyor pipe. Moreover, the high speed of the fluid jet issuing from the auger shaft into the relatively substantially larger pipe has resulted in the formation of strong whirls or eddy-currents in the conveyor pipe at the point where the conveyed material injected into the pipe by the auger meets with the entering conveying fluid. Such whirls or eddy-currents are obviously detrimental to efficient conveyor action and may result at times in a complete stoppage of the conveyor pipe. This difficulty has been contributed to by the fact that the jet of conveying fluid issuing from the hollow auger shaft in prior conveyors has occupied but a small portion of the cross-section of the conveyor pipe at the point where the conveyed goods are received in said pipe, and it has been impossible always to inject such conveyed goods into the pipe in proper position to be efficiently acted upon by such a jet current.

In accordance with the instant invention, the foregoing difficulties are to a large extent overcome by having an auger of greater over-all diameter than the conveyor pipe axially spaced slightly from the end of the pipe, and received in the large end of a funnel extending from the pipe, the auger thus delivering the material into the funnel and into an injection orifice defined jointly by the funnel and the end of the hollow auger shaft. In such an arrangement the hollow auger shaft may be of substantially the same diameter as the conveyor pipe so that the current of air issuing from the shaft will substantially fully occupy the cross-sectional area of the pipe and greatly diminish or avoid entirely the creation of disrupting eddy-currents or whirls of air at the point where the goods are introduced into the conveyor pipe.

Moreover, by such an arrangement the invention provides means for efficiently injecting fibrous or flocculent material into a conveying air blast utilizing both a mechanical action of the auger and the air injection currents induced through the injection orifice aforementioned by the action of the conveying air blast.

Moreover, by the arrangement above described, means are provided for feeding the conveyed material in an annular shaft surrounding the auger path and radially consolidating said material around the end of the auger shaft into the path of the air issuing from said shaft for efficient conveyance through the pipe by such air.

The foregoing features and advantages are all inherent in the preferred embodiment of the invention illustrated in the accompanying drawing in which:

Figure 1 represents a view partly in elevation and partly in section of a blower elevator constructed in accordance with the invention, same being arranged to deliver the conveyed material into a silo or other suitable storage receptacle; and, Figure 2, a cross-section on the line 2—2 of Figure 1.

Referring now in detail to the accompanying drawings, the numeral 1 designates a feed hopper which may be of substantially U-shaped cross-section opening upwardly as shown in Figure 2, the bottom of the hopper being of uniform cylindrical curvature as shown. Rotatably disposed in this hopper 1 is a substantially horizontally extending auger generally designated 2 having a hollow shaft 2a snugly rotatably disposed through an opening in one end wall 3 of the hopper 1 and freely rotatably supported in bearings 4—4 exteriorly of the hopper.

A sprocket wheel or ring 5 fixed concentrically about the exterior end of the auger shaft 2a exemplifies a suitable means whereby the shaft 2a may be rotated from any suitable source of power in a direction whereby the external auger flight 2b on said shaft 2a will urge the contents of the trough 1 toward its discharge end or to the right in Figure 1. A blast of air is delivered into the end of said pipe or shaft 2a and toward its discharge end from a usual centrifugal fan 6 rotating about a shaft 7 in housing 8, the discharge pipe 10 of the fan housing extending into the adjacent open end of hollow shaft 2a in such manner that the shaft 2a is free to rotate relative to discharge pipe 10 while in open communication therewith. If desired, suitable packing rings or material 11 may be interposed between the shaft 2a and pipe 11, though this is not essential since it will be seen that the air discharged from the pipe 10 into shaft 2a will tend only to draw additional air into the pipe 2a between it and shaft 11 and this will not in any way adversely affect the functioning of the mechanism herein described.

The fan 6 may be driven in any suitable manner as by the conventional belt drive 12 from a motor 13 as shown in Figure 1.

The discharge end of the hopper 1 is defined by a funnel or funnel structure 15 which is substantially axially aligned with and receives the discharge end of the auger 2. It will be noted that the large end of the funnel 15 opens into the hopper 1 and the small end of said funnel communicates with a conveyor pipe or conduit 16 preferably of uniform diameter or cross-sectional area which may consist of several interconnected sections. For purposes of exemplification of the preferred use of the invention the discharge pipe 16 of the present embodiment is shown as arranged to elevate the conveyed material appreciably and discharge it into a suitable storage structure such as a conventional silo 17. The auger 2 extends axially into funnel 15 and terminates short of the smaller or discharge end of the funnel which end in the instant embodiment is the same diameter as the pipe 16. The over-all diameter of the auger 2 thus may be and in the preferred embodiment is substantially greater than that of the discharge end of the funnel 15 or its associated conveyor pipe 16. This permits the hollow shaft 2a to have substantially the same internal diameter as the discharge or conveyor pipe 16 so that the air from the hollow shaft 2a will enter the pipe 16 in substantial volume such as will substantially completely occupy the full cross-sectional area of the pipe 16 and will minimize the chance of creating harmful eddy-currents or whirls of air at the point where the conveyed material is delivered into the pipe 16. Preferably the discharge end of the shaft 2a will be slightly inwardly tapered as at 18 to thus provide a construction through which the air must pass as it moves toward the conveyor pipe 16. In this arrangement the end 18 of the auger shaft and the surrounding funnel 15 cooperate to define an annular inlet orifice or Venturi jet 19 through which a substantial flow of air into the pipe 16 is induced by the action of the air current issuing from the discharge end of shaft 2a. It will be noted that this orifice 19 communicates directly with external atmosphere through the immediately adjacent end of the upwardly opening hopper 1.

Thus, in the operation of the mechanism above described material fed into the hopper 1 in any suitable manner is fed by the auger 2 toward the funnel 15. Such material normally surrounds the auger shaft 2a in substantially cylindrical conformation and is radially inwardly consolidated as it is fed through the funnel 15 to thus be fully positioned in alignment with the blast of air issuing from the shaft 2 as it passes from the discharge end of said shaft into the conveyor pipe 16. In this manner the material is delivered into the pipe 16 in proper position to be most efficiently acted upon by the conveying air currents.

The action of the auger flight 2b in urging the conveyed material through the funnel 15 is substantially supplemented by the action of the inflowing currents of air which enter the pipe 16 through the annular Venturi jet or injection orifice 19, these being induced by the action of the air issuing from the auger shaft 2a in accordance with well known principles of physics.

Preferably the top or upper portion 15' of the funnel is disposed to leave substantial clearance between it and the end of the auger 2 therebeneath, both to permit a slight vertical play of the auger 2 in operation and also to somewhat enlarge the upper portion of the orifice 19 so that air may continue to flow through said enlarged upper portion of the orifice even though the lower portion thereof is substantially obstructed by conveyed material therein. With this arrangement, even though the hopper 1 receives an overload or charge of material which tends to pile up over the auger 2, and thus to obstruct the enlarged upper portion of the orifice 19, such obstruction by reducing the size of the orifice will increase the velocity of the air therethrough and this in turn will tend to expedite the feeding of material and thus clear the orifice. This is, of course, an important and highly advantageous feature of the invention.

In this application I have shown and described only the preferred embodiment of the invention simply by way of illustrating the preferred mode contemplated by me of carrying out the invention. However, inasmuch as the invention is obviously capable of modification in various respects, it will be appreciated that the drawings and description herein are merely illustrative in nature and not exclusive.

I claim:

A blower conveyor for chopped hay and the like comprising a hopper open at its top to the atmosphere, an auger mounted adjacent the bottom of said hopper for rotation about a generally horizontal axis, a funnel at one lateral end of said hopper and axially aligned with said auger, said funnel having a conical section the larger end of which communicates directly with said hopper and the smaller end of which is remote from the hopper, said auger comprising a hollow shaft having a body portion disposed in said hopper and a discharge end projecting into said funnel, the diameter of said body portion and the diameter of said smaller end of said funnel being substantially the same, said discharge end being internally and externally tapered toward its outer end and terminating short of said smaller end of the conical section of said funnel, said shaft having peripheral flights operative on rotation of the shaft in one direction to feed material deposited in said hopper into said funnel, the peripheral flights on the discharge end of the shaft being of progressively reduced diameter toward said outer end thereof, the size of said discharge end of said auger being materially less than the size of the conical portion of said funnel whereby a passage is provided and the smaller end of said conical portion freely communicates with said hopper and the outside atmosphere, and means for blowing air through said hollow shaft toward said discharge end.

References Cited in the file of this patent

UNITED STATES PATENTS

| | | |
|---|---|---|
| 804,160 | Neville | Nov. 7, 1905 |
| 998,762 | Faller | July 25, 1911 |
| 1,128,043 | Quigley | Feb. 9, 1915 |
| 1,423,536 | Moser | July 25, 1922 |
| 1,757,832 | Goebels | May 6, 1930 |
| 2,785,019 | Canbet | Mar. 12, 1957 |